United States Patent [19]

Tweed et al.

[11] Patent Number: 5,323,667
[45] Date of Patent: Jun. 28, 1994

[54] INTEGRATED ENGINE AND TRANSMISSION CONTROL SYSTEM

[75] Inventors: Lorne W. Tweed, Peoria; Michael B. Brennemann, Pekin; Kevin D. King, Peoria; William M. McClure, Peoria; William J. Tate, Peoria, all of Ill.

[73] Assignee: Caterpillar Inc., Peoria, Ill.

[21] Appl. No.: 955,640

[22] Filed: Oct. 2, 1992

[51] Int. Cl.[5] .................................... B60K 41/08
[52] U.S. Cl. ........................ 477/107; 364/424.1; 477/122; 477/155
[58] Field of Search .................... 74/856, 866, 867; 364/424.1

[56] References Cited

U.S. PATENT DOCUMENTS

| | | | |
|---|---|---|---|
| 3,645,366 | 2/1972 | Numazawa et al. | 192/0.08 |
| 3,667,577 | 6/1972 | Weymann | 192/0.08 |
| 3,763,720 | 10/1973 | Aono et al. | 74/857 |
| 4,219,154 | 8/1980 | Luscomb | 239/91 |
| 4,266,447 | 5/1981 | Heess et al. | 74/858 |
| 4,314,340 | 2/1982 | Miki et al. | 74/866 |
| 4,354,236 | 10/1982 | Miki et al. | 74/866 |
| 4,355,550 | 10/1982 | Will et al. | 74/872 |
| 4,370,903 | 2/1983 | Stroh et al. | 74/858 |
| 4,403,527 | 9/1983 | Mohl et al. | 74/851 |
| 4,484,497 | 11/1984 | Hibino | 74/859 |
| 4,493,228 | 1/1985 | Vukovich et al. | 74/858 |
| 4,520,694 | 6/1985 | Eschrich et al. | 74/858 |
| 4,569,254 | 2/1986 | Itoh et al. | 74/866 |
| 4,593,580 | 6/1986 | Schulze | 74/858 |
| 4,616,530 | 10/1986 | Tanaka et al. | 74/851 |
| 4,621,545 | 11/1986 | Mohl | 74/866 |
| 4,653,455 | 3/1987 | Eblen et al. | 123/506 |
| 4,677,880 | 7/1987 | Hattori et al. | 74/866 |
| 4,683,778 | 8/1987 | Pfalzgraf | 74/858 |
| 4,690,017 | 9/1987 | Taniguchi et al. | 74/866 |
| 4,744,031 | 5/1988 | Takeda et al. | 364/424.1 |
| 4,819,163 | 4/1989 | Shimizu et al. | 364/424.1 |
| 4,819,777 | 4/1989 | Yasue et al. | 192/0.062 |
| 4,838,124 | 6/1989 | Hamano et al. | 74/866 |
| 4,841,447 | 6/1989 | Hayashi et al. | 364/431.07 |
| 4,891,759 | 1/1990 | Kato | 364/424.1 |
| 4,915,075 | 4/1990 | Brown | 123/399 |
| 4,938,100 | 7/1990 | Yoshimura et al. | 74/860 |
| 4,942,787 | 7/1990 | Aoki et al. | 74/867 |
| 4,945,481 | 7/1990 | Iwatsuki et al. | 364/424.1 |
| 4,972,332 | 11/1990 | Luebbering et al. | 364/565 |
| 4,993,283 | 2/1991 | Kikuchi et al. | 74/858 |
| 5,012,699 | 5/1991 | Aoki et al. | 74/866 |
| 5,020,391 | 6/1991 | Aoki et al. | 74/866 |

Primary Examiner—Leslie A. Braun
Assistant Examiner—Daniel Wittels
Attorney, Agent, or Firm—R. Carl Wilbur

[57] ABSTRACT

A control system is provided for a vehicle regulating engine speed during shifts so as to reduce driveline torque and shift shock. The control system includes separate microprocessor based engine and transmission controllers which communicate via a data link. When a shift is initiated, the transmission controller delays a period of time sufficient for the transmission to disengage the old gear ratio and then produces a CTSSPEED signal. The transmission controller continues to produce the CTSSPEED signal for a second period of time which corresponds to the time required for the transmission to engage the new gear ratio.

The engine controller receives the desired engine speed signal and regulates engine speed into correspondence with the desired speed. During upshifts, the CTSSPEED signal is set to a speed which is a predetermined amount above the synchronization speed of the new gear for an upshift. Conversely, during downshifts, the CTSSPEED is set to a speed which is a predetermined amount below the synchronization speed in the new gear.

20 Claims, 5 Drawing Sheets

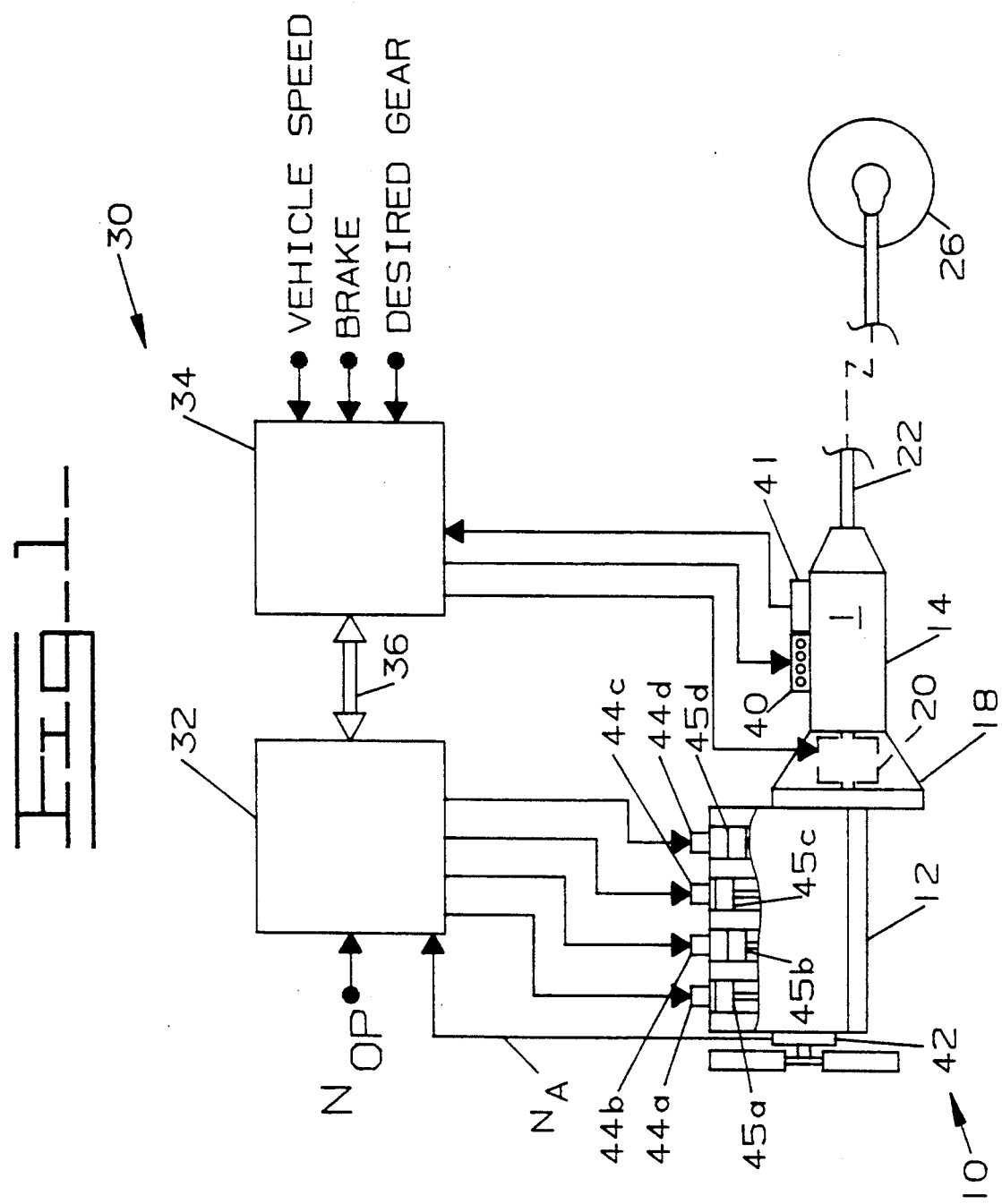

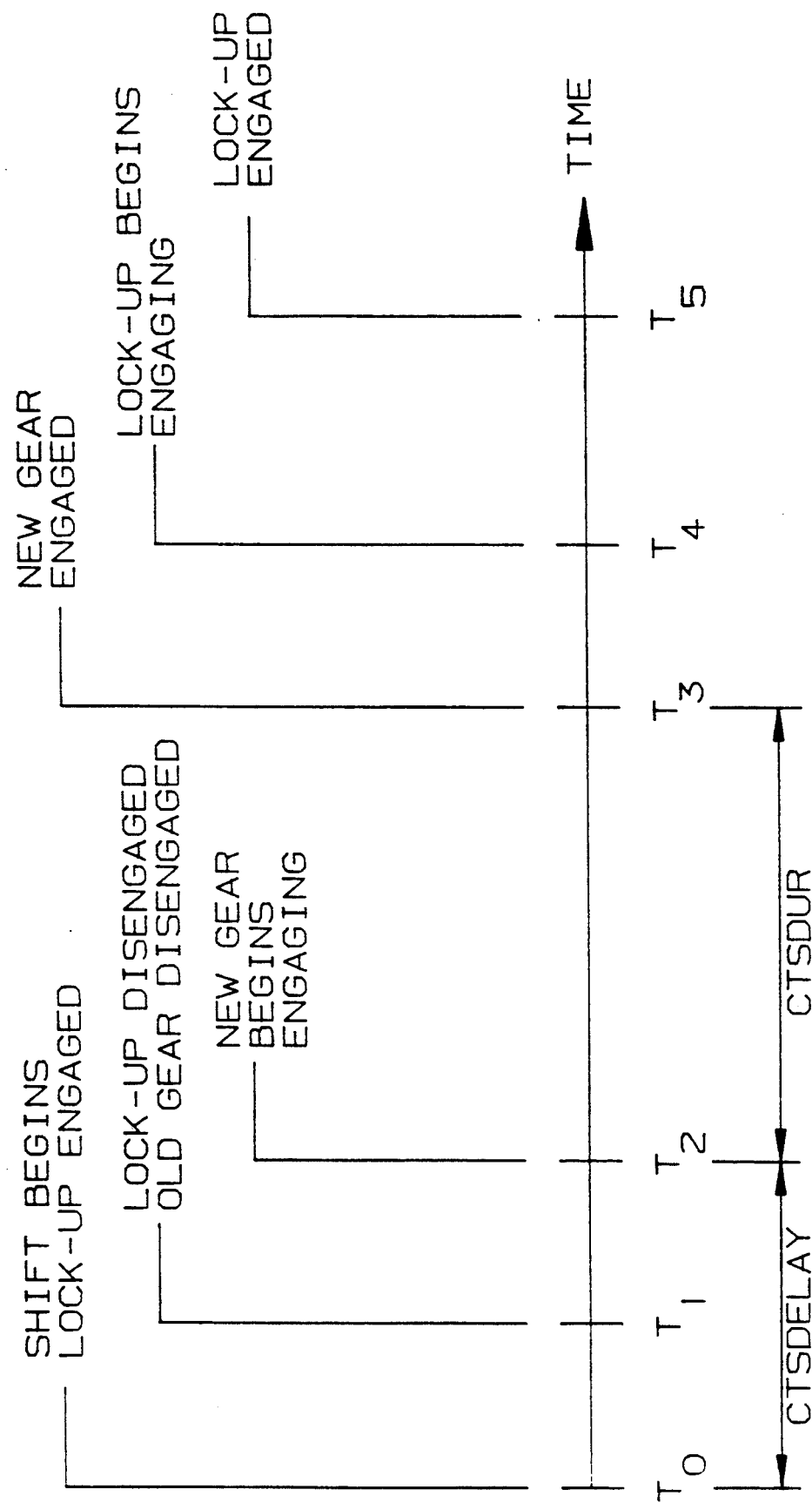

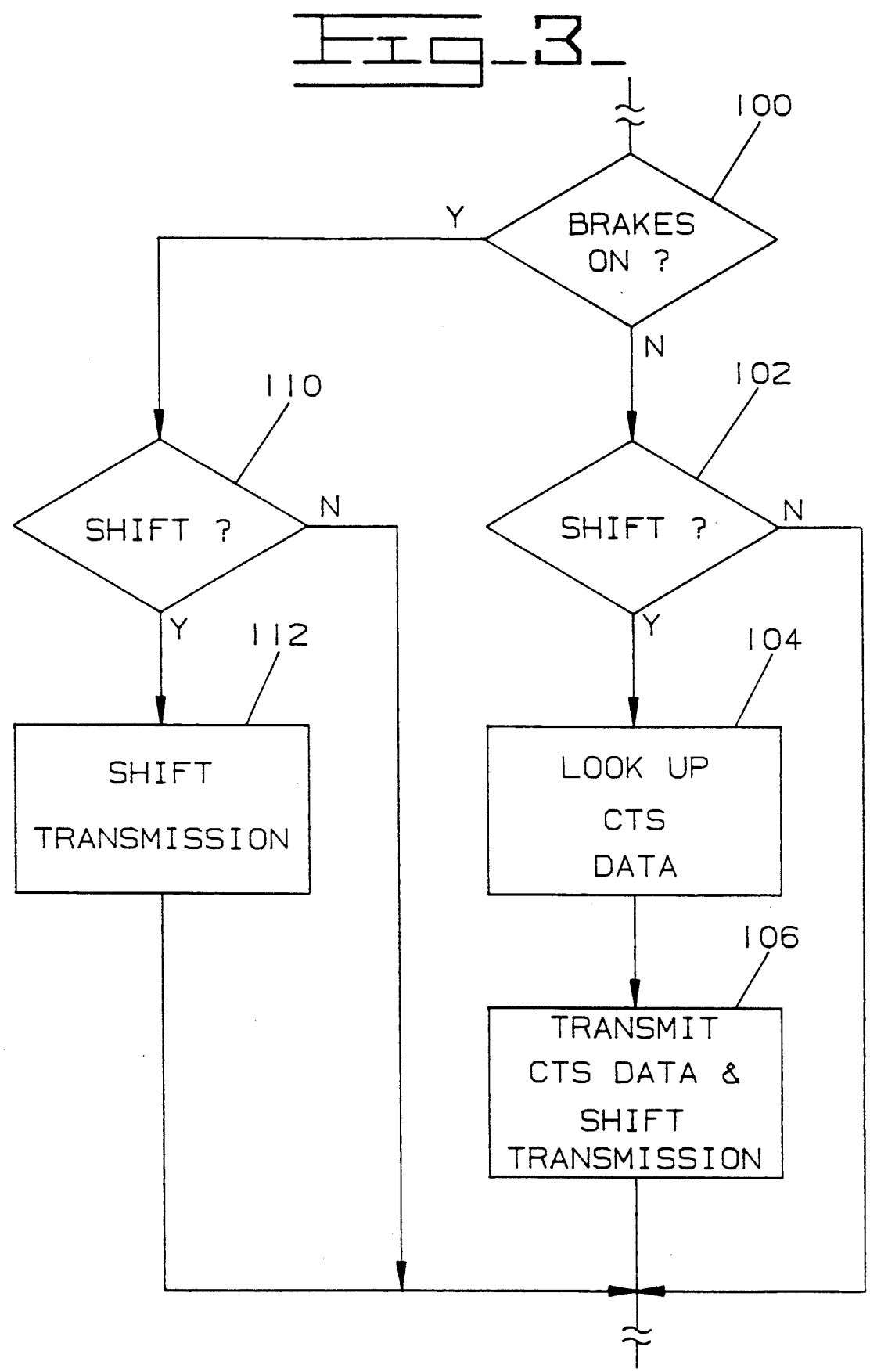
Fig_3_

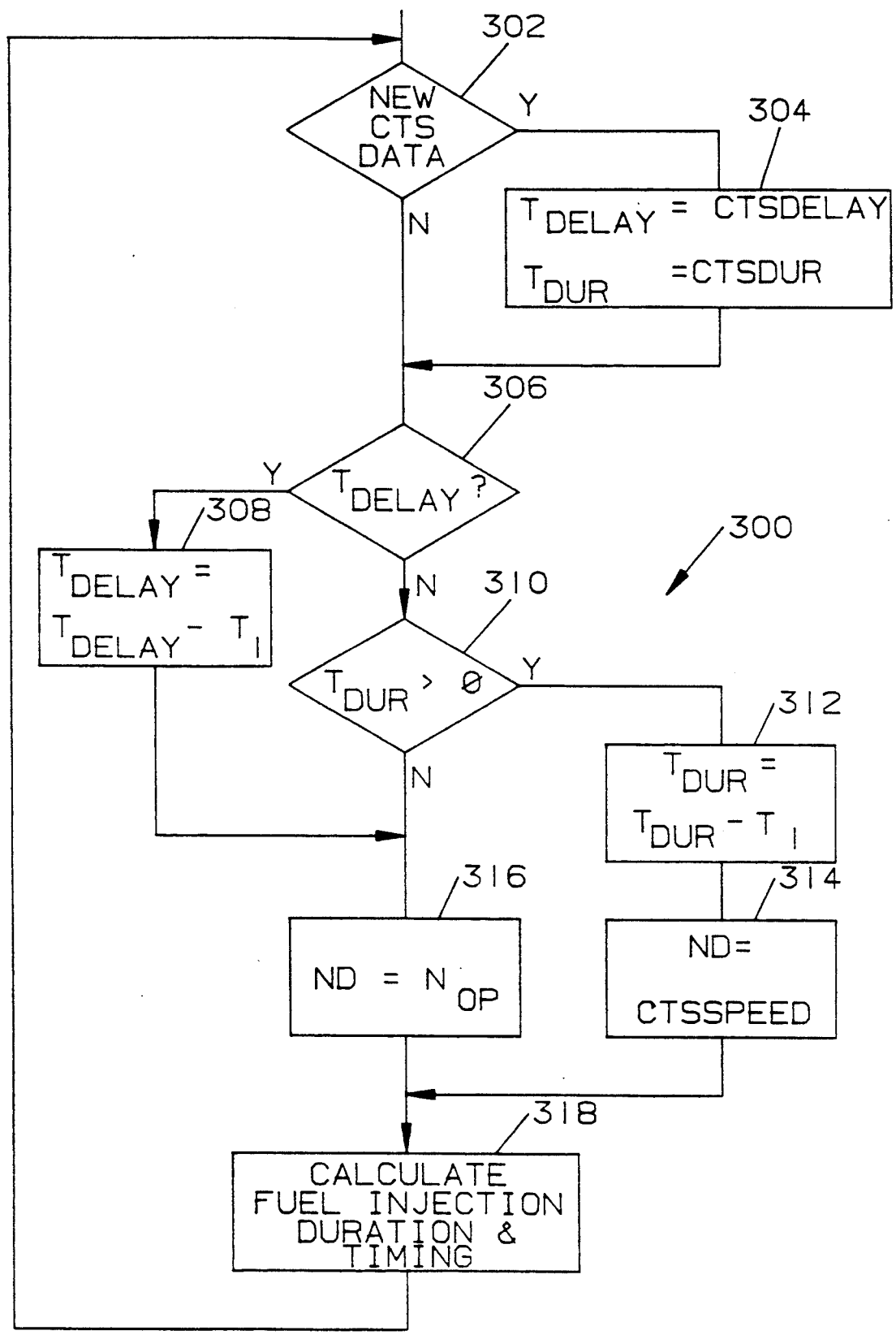

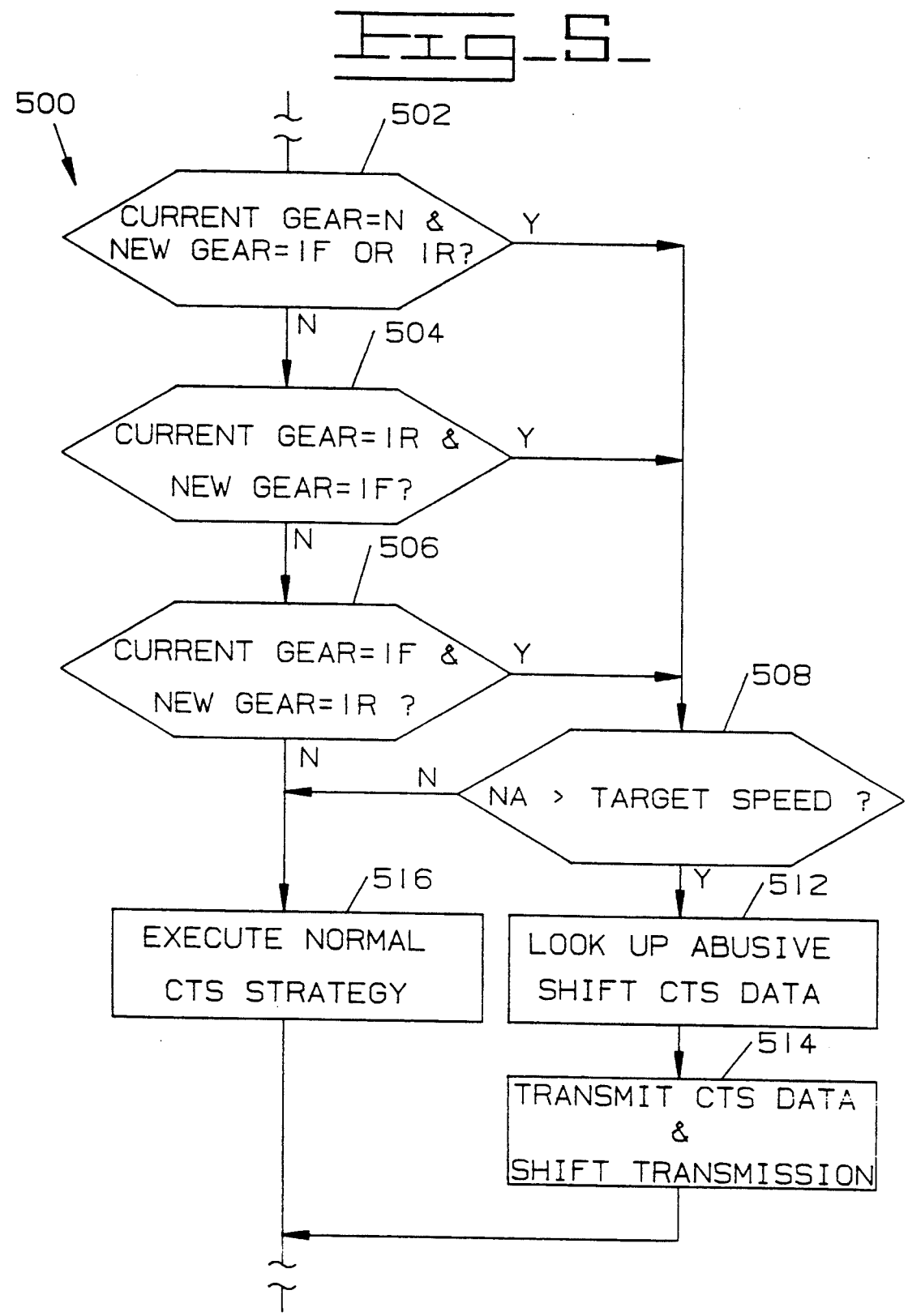

INTEGRATED ENGINE AND TRANSMISSION CONTROL SYSTEM

DESCRIPTION

1. Technical Field

This invention relates generally to an integrated engine and transmission controller and, more specifically, to a system which regulates engine speed during shifting to achieve improved shift characteristics.

2. Background Art

Traditional automatic transmission controls effect powershift gear changes in accordance with a preselected shift map, e.g. at specified ground speeds, even if the engine is at full speed and full throttle. Gear changes according to this method are inefficient and result in excessive wear to driveline components. More specifically, the transmission clutches are required to absorb the change in kinetic energy stored in the system and the energy generated by the engine during the gear changes. Additionally, such systems can exhibit excessive shift shock when the new gear is engaged due to the difference between the engine speed and the transmission speed in the new gear.

In view of these problems, vehicle manufactures have developed control systems that are commonly referred to as integrated engine and transmission controllers. These systems function to reduce engine power during shifts to obtain satisfactory shift characteristics and increase the durability of the transmission clutches. Such systems generally reduce the engine speed during the shift by retarding ignition timing, reducing fuel injection or through a combination of both. Examples of integrated controllers are disclosed in U.S. Pat. Nos. 4,226,447; 4,355,550; 4,370,903; and 4,403,527.

The subject invention is directed towards providing an integrated engine and transmission controller which exhibits superior performance with respect to known systems.

DISCLOSURE OF THE INVENTION

In accordance with one aspect of the present invention, a control system is provided for a vehicle having an engine connected to and adapted to drive an automatic transmission through a torque converter. The transmission includes a plurality of transmission gear ratios and an actuator automatically establishing a particular gear ratio in response to a transmission control signal. A transmission controller is adapted to sense at least one operating parameter and produce transmission control signals in response to the sensed parameter and in accordance with a predetermined shift map. The transmission controller is further adapted to produce a CTSSPEED signal during a change from an old gear ratio to a new gear ratio. The CTSSPEED signal corresponds to a speed which is a predetermined amount above the synchronization speed of the new gear for an upshift and a predetermined amount below the synchronization speed in the new gear for a downshift. An engine speed sensor is adapted to sense engine speed and produce an actual engine speed signal. An engine controller is adapted to receive an operator desired engine speed signal, the actual engine speed signal and the CTSSPEED signal. The engine controller calculates an error signal in response to a difference between the actual and desired speed signals when the CTSSPEED signal is not received, calculates an error signal in response to a difference between the CTSSPEED signal and the actual engine speed signal when the CTSSPEED signal is received, and regulates actual engine speed so as to reduce the error signal to zero.

In accordance with a second aspect of the present invention, the transmission controller is adapted to set the CTSSPEED signal to a value which corresponds to engine idle and to set the second time period to a value which is greater than the second time period for automatic gear change during manual gear changes.

BRIEF DESCRIPTION OF THE DRAWINGS

FIG. 1 is a schematic illustration of a vehicle control system incorporating the present invention;

FIG. 2 is a timeline illustrating a typical shift in accordance with the present invention; and FIGS. 3-5 are software flowcharts for practicing certain aspects of the present invention.

BEST MODE FOR CARRYING OUT THE INVENTION

Referring now to FIG. 1, the present invention will be described. FIG. 1 is a schematic illustration of a vehicle power plant 10 to which the present invention can be applied. The power plant 10 is equipped with an engine 12 and an automatic transmission 14. The present invention was developed for a transmission having neutral, a plurality of forward gear ratios and a reverse gear ratio; however, it can readily be adapted to different transmission configurations, as would be apparent to one skilled in the art. The input of the transmission 14 is connected to and driven by the engine 12 through a torque converter 18 equipped with a lockup clutch 20. The output of the transmission 14 is connected to and adapted to rotatably drive a shaft 22. The shaft 22 is in turn connected to and adapted to drive a ground engaging wheel 26, thereby propelling the vehicle. In this manner, engine torque or power is transmitted to the wheel 26 with a predetermined speed ratio.

A vehicle control system 30 includes engine and transmission controllers 32,34 which are embodied in separate microprocessors adapted to communicate via a data link 36. Numerous commercially available microprocessors can be adapted to perform the functions of the engine and transmission controllers. Applicant has developed the present invention using series MC68HC11 microprocessors as manufactured by Motorola, Inc. of Schaumburg, Ill. It should be appreciated that both controllers could readily be embodied in a single microprocessor without departing from the scope of the present invention.

The transmission controller 34 is adapted to receive inputs including a vehicle speed signal, and effect gear changes in the transmission 14 in response to the received signals and in accordance with a predetermined shifting strategy, as is common in the art. For this purpose, the transmission 14 is provided with upshift and downshift solenoids 40. The controller 34 selectively delivers control signals to these solenoids to initiate gear change operations. Actuation of one of the shift solenoids 40 displaces a rotary selector valve (not shown) to a position corresponding to the new gear. When the selector valve is repositioned in this manner, the transmission automatically disengages the new gear and engages the new gear, as is common in the art. The transmission controller 34 is also electrically connected to the lockup clutch 20 for controlling its engagement and disengagement during shifting in accordance with a preselected strategy as explained below.

A gear selector (not shown) is provided for indicating a desired transmission gear ratio and direction of travel. It should be appreciated that the gear selector can be embodied in any device or combination of devices capable of providing an electrical signal for indicating a desired gear ratio and direction of travel. For example, the gear selector can be in the form of movable lever having a neutral position and a plurality of forward gear positions and reverse position. A sensor (not shown), such as a switch or potentiometer, is adapted to sense the position of the gear selector and produce a desired gear signal responsive to the selector's position. The desired gear signal is supplied to the transmission controller 34, as indicated in FIG. 1. As vehicle speed increases, the transmission controller 34 effects gear shifting in accordance with the preset shift map until the desired gear is reached.

An actual gear sensor 41 is provided for sensing the actual transmission gear ratio and producing an actual gear ratio signal. Preferably, the sensor 41 is in the form of a combination of switches which produce a unique code for each transmission gear ratio as would be appreciated by one skilled in the art. The transmission controller 34 has an input adapted to receive the actual gear ratio signal.

Additionally, the transmission controller 34 receives a braking signal from brake sensor (not shown) which indicates if a braking operation is being performed. This sensor can be embodied in any device, such as a switch, which is capable of producing an electrical signal for indicating that a braking operation is being performed. In the present invention, the braking signal is produced whenever the vehicle brakes, retarder brake or parking brakes are active.

The engine controller 32 is adapted to receive operating parameters including an operator desired speed signal $N_{OP}$ and an actual engine speed signal $N_A$ and responsively regulate engine speed in a closed-loop control. For this purpose, the control system includes a pedal position sensor (not shown) which is adapted to produce an electrical signal responsive to the position of the vehicle's accelerator pedal (not shown). One suitable position sensor for performing this function is disclosed in U.S. Pat. No. 4,915,075 which issued to Brown on Mar. 20, 1989. Additionally, the control system includes an engine sensor 42 which is adapted to sense engine speed and produce an engine speed signal. Preferably, the engine speed sensor 42 is in the form of a magnetic pick-up sensor adapted to produce a signal corresponding to the rotational speed of the engine 12. One suitable sensor is described in U.S. Pat. No. 4,972,332 which issued to Luebbering et al. on Nov. 20, 1990. The sensor disclosed therein is capable of determining the speed, angular position and direction of rotation of a rotatable shaft.

The engine controller 32 processes the received signals to produce a fuel injection control signal $I_{fuel}$ for regulating the fuel delivery to the engine in response to a difference (i.e., error) between a desired engine speed signal and the actual engine speed signal and in accordance with horsepower map (not shown) as is common in the art. Normally, the desired engine speed signal is equal to the operator desired speed signal. Preferably, actual engine speed is regulated into correspondence with the desired engine speed using a proportional-integral-differential (PID) control loop. While a PID loop is preferred, it should be appreciated that the present invention could readily be adapted for use with other control strategies such as a proportional-integral control.

The injection control signal is delivered to solenoid operated fuel injector units 44a-d associated with individual engine cylinders 45a-d (four shown for illustration purposes) of the engine 12. The duration of the injection control signal corresponds to the on-time of the solenoid, thereby controlling the duration for which the injector delivers 44 fuel to associated cylinder 45 during the combustion cycle. Solenoid operated fuel injectors of this type are well known in the art and it is perceived than any of them can be used with the present invention. One suitable solenoid operated fuel injector is shown in U.S. Pat. No. 4,219,154 which issued Aug. 26, 1980 to Douglas A. Luscomb. It discloses a solenoid controlled, hydraulically actuated unit injector. Another suitable solenoid is shown in U.S. Pat. No. 4,653,455, issued Mar. 31, 1987 to Eblen et al. It discloses a solenoid controlled, mechanically actuated unit injector.

As was stated above, the engine speed is normally controlled in response to the operator desired speed signal $N_{OP}$. However, during gear changes engine speed is regulated in response to a desired engine speed signal produced by the transmission controller 34 and in accordance with a preselected strategy which is referred to as Control Throttle Shifting (CTS). The CTS strategy limits engine speed during shifting so as to reduce the driveline torques and clutch thermal loads developed during shifting. In prior systems of this type, the engine speed has typically been regulated to idle speed or the synchronization speed in the next gear. It was found that both of these control strategies can lead to unacceptable hesitation and decreased acceleration performance during the shift.

Controlling to idle speed is undesirable because when the transmission reengages, the engine speed can be slower than the transmission input speed. This speed differential will vehicle deceleration due to engine braking. Depending on the duration of the deceleration period, the operator will feel this as either a rough shift or a shift with unacceptable acceleration.

For a similar reason, it has been found that controlling directly to synchronous speed is undesirable in vehicles equipped with torque converters. More specifically, torque converters do not transmit any torque unless there is a speed differential between its input speed (i.e., engine speed) and output speed (i.e., transmission input speed). During shifts, the lockup clutch is disengaged and, hence, no torque will be transmitted to the transmission unless there is a speed differential across the torque converter. Therefore, if engine speed is controlled to synchronous speed the torque available at the transmission input will be effectively zero at the end of the shift. This torque interruption will be perceived by the operator as a hesitation during the shift and will result in less than optimal acceleration performance.

In response to these problems, the subject control regulates engine speed to a speed which is a predetermined amount above the synchronization speed in the new gear during upshifts. Similarly, during downshifts the subject control regulates engine speed to a speed which is a predetermined amount below the synchronization speed in the new gear. In applicant's system, the engine speed is controlled to approximately 150 rpm above and below the synchronization speed during upshifts and downshifts, respectively. This offset was empirically determined to minimize the stress on the driveline components without resulting in unacceptable shift hesitation and torque interruption. This offset is dependent on the performance characteristics of the torque converter, engine and transmission.

In order to effect the CTS strategy, the transmission controller 34 includes a CTS map stored in its memory. For each gear change, the CTS map provides a CTS time delay (CTSDELAY), a CTS desired engine speed (CTSSPEED), and a CTS duration (CTSDUR). CTSSPEED corresponds to the desired speed which the engine controller 32 is to use during the shift. CTSDELAY corresponds to a time delay between the start of a shift and the time at which the engine controller 32 is to start regulating the engine to CTSSPEED. This time is empirically determined and approximates the time required for the transmission to disengage the old gear. CTSDUR corresponds to the time for which the engine controller 32 is to regulate engine speed to the CTSSPEED. This duration is empirically determined and approximates the time required to engage the new gear. These values are transmitted to the engine controller 32 via the data link 36 at the start of a shift.

When CTS data is received, the engine controller 32 sets a delay timer equal to CTSDELAY. When this timer times out, the desired engine speed is set to CTSSPEED. The engine controller 32 regulates engine speed to CTSSPEED for a time equal to CTSDUR. After this time elapses, control of engine speed is returned to the accelerator pedal. Preferably, control is returned to the accelerator pedal in a ramped or stepwise fashion to prevent abrupt changes in engine speed.

Referring now to FIG. 2, a typical shift sequence will be explained in more detail. At time $T_0$, the transmission controller 34 determines that a shift is needed based on a predetermined shift strategy, e.g. based on vehicle speed in the current gear. At this time, the vehicle is in lockup drive or direct drive, wherein the lockup clutch 20 engaged such that the transmission 14 is directly driven by the engine 12. Conversely, during gear changes the vehicle operates in torque converter drive, wherein the lockup clutch 20 disengages and the engine 12 drives the transmission 14 through the torque converter 18. When the transmission controller 34 determines a shift is required, it simultaneously transmits the CTS data over the communications link 36 and initiates the gear change operation by disengaging the old gear and the lockup clutch 20. Disengagement is not instantaneous because of the delays associated with the hydraulics in the transmission 14. However, by time $T_1$, both the lockup clutch 20 and the old gear are assumed to be disengaged.

Subsequently, at time $T_2$ the new gear begins engagement. The time between $T_0$ and $T_2$ is measured under lab conditions to determine the approximate time delay between the initiation of a gear shift operation and the time at which the new gear begins engagement. From these measurements, a CTSDELAY is determined for each gear change operation. Hence, at approximately the same time the new transmission gear begins engagement, the engine controller 24 starts to regulate the engine speed to CTSSPEED.

The engine speed is regulated to CTSSPEED for a period of time equal to CTSDUR. CTSDUR is empirically determined as the time required for the new gear to completely engage. Hence, when CTSDUR expires at time $T_3$ the new transmission gear is assumed to be completely engaged. At this point, engine speed is regulated to the operator desired speed $N_{OP}$ as indicated by the accelerator pedal. At time T4, the lockup clutch 20 begins engagement. Subsequently, at time $T_5$, the lockup clutch 20 engages and the vehicle is returned to direct drive.

Referring now to FIGS. 3-5, an embodiment of software for programming the controllers 32,34 in accordance with certain aspects of the immediate invention is explained. FIGS. 3-5 are flowcharts illustrating a computer software program for implementing the preferred embodiment of the present invention. The program depicted in this flowchart is particularly well adapted for use with the MC68HC11 microprocessor and associated components described above, although any suitable microprocessor may be utilized in practicing an embodiment of the present invention. These flowcharts constitute a complete and workable design of the preferred software program, and have been reduced to practice on the series microprocessor system. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

Referring specifically to FIG. 3, software for programming the transmission controller 34 will be explained. Initially, in the block 100, the controller 34 samples the brake sensor to determine if the vehicle's brakes are in operation. If no braking operation is detected, control is passed to the block 102. In the block 102, the controller 34 determines if a shift operation should be made based on the shift control map stored in memory. If no shift is required, control is returned to the main program (not shown).

However, if a shift is required control is passed to the block 104. In the block 104, the transmission controller 34 retrieves the CTS data for the gear change which is to occur. More specifically, the controller 34 retrieves the values of CTSDELAY, CTSSPEED and a CTSDUR for the current shift.

Control is then passed to the block 106 where the transmission controller 34 initiates the shift sequence. More specifically, the controller 34 transmits a disengage signals to disengage the lockup clutch 20 and the current gear ratio, as was explained above. Simultaneously, the controller 34 transmits the CTS data to the engine controller 32 via the data link 36.

Conversely, if a braking operation is detected in the block 100, control is passed to the block 110. If braking is detected, the normal CTS strategy is not performed and the controller 34 accesses a braking shift map which causes shifts to occur at higher ground speeds than are normally used to effect shifts.

Referring now to FIG. 4, software for programming the engine controller 32 in accordance with the present invention will be explained. FIG. 4 represents an Fuel Injection Control Loop 300 which is continuously executed at a predetermined rate. Initially, in the block 302, the engine controller 32 samples the data link 36 to determine if the transmission controller 34 has transmitted any new CTS data. If new data is detected, control is passed to the block 304. In the block 304, a delay timer ($T_{DELAY}$) is initialized to a time equal to CTSDELAY and a duration timer ($T_{DUR}$) is initialized to a time equal to CTSDUR.

Control is then passed to the block 306 where the delay timer is checked to see if it is greater than zero. If it is, control is passed to the block 308 where the delay timer is decremented by a predetermined amount (T1) which corresponds to the execution time for the engine control loop 300. Control is then passed to the block 316 where the desired speed (ND) is set to the value of the operator desired speed signal ($N_{OP}$).

Next, control is passed to the block 318 where the engine controller 32 calculates the injection signal as was explained above. Control is then returned to the block 302, where the process is again repeated. The control will continue to loop through the blocks 302, 306, 308, 316 and 318 until the time equal to CTSDELAY has expired. This will be indicated when the test in block 306 is answered in the negative. When this occurs, control is passed to the block 310.

In the block 310, the duration timer is checked to see if it exceeds zero. The first time through the block 310 during a shift sequence the duration timer will be equal to CTSDUR. If this test is answered in the affirmative, control is passed to the block 312 where the duration timer is decremented by the predetermined amount (T1). Control is then passed to the block 314 where the desired speed (ND) is set to the value of CTSSPEED. Next, the injection signal is calculated in the block 318 so as to regulated engine speed to CTSSPEED. The control continues to loop through the blocks 302, 306, 310, 312, 314, 318 until the duration timer times out. When this occurs, the test in block 310 will be answered in the negative and control of engine speed is returned to the accelerator pedal signal.

Referring now to FIG. 5, software for implementing an embodiment of an optional Directional Shift Limiter Control Loop 500 will be described. The Directional Shift Limiter Control Loop 500 is employed to limit engine torque when the operator requests a directional change, e.g., forward to reverse, or when the gear selector is moved from neutral to first gear forward 1F or to first gear reverse 1R. The transmission controller 34 performs these checks in the blocks 502 to 504. If any of these tests are answered in the affirmative, control is passed to the block 508, where the controller 34 compares the actual engine speed $N_A$ to a preselected value (Target Speed). If the actual engine speed NA is above the preselected value, control is passed to the block 510 where a modified version of the CTS strategy illustrated in FIG. 3 is performed.

Initially, in the block 510, the controller 34 retrieves the CTS data for the requested shift. This data is essentially the same as that for a normal CTS shift; however, the Modified CTS strategy uses a lower CTSSPEED and a longer CTSDUR. Control is then passed to the block 312 where the Directional Shift Limiter CTS data is transmitted to then engine controller 32 and the shift is initiated.

Conversely, if all of the test in blocks 502-506 are answered in the negative, or if actual engine speed is below the target engine speed, control is routed to the block 514. In the block 514, the control executes the normal CTS strategy as illustrated in FIG. 3. In the case of a manual shift where the engine speed is below the target speed, the requested shift will be executed using the CTS data for an automatic shift into the requested gear.

The Directional Shift Limiter CTS strategy is employed in conditions where the operator initiates a shift sequence with an excessive engine speed. During a CTS shift, there is a trade off between performance (i.e., vehicle acceleration) and shift shock reduction. A higher CTSSPEED and a shorter CTSDUR is used during automatic shifts in order to maintain acceleration during the shift. This is not a problem because the shift is initiated by the transmission controller 34 and, hence, the engine speed at the start of the shift will be known. However, during manual shifts, the speed of the engine at the start of the shift will be controlled by the operator and such speeds can result in excessive torques in the driveline. This problem is accentuated in first gear where the highest torque changes occur. By employing a lower CTSSPEED and an extended CTSDUR, the Directional Shift Limiter CTS strategy reduces driveline wear and shift shock during shifts into first gear and directional changes. This strategy reduces the acceleration during such shifts, but the loss in acceleration is outweighed by the decreased likelihood of drive line damage. The Directional Shift Limiter strategy was specifically developed to address problems associated with implementing the CTS strategy in construction vehicles. In such applications, it is common for vehicle operators to make repeated directional shifts in order to rock the vehicle if it becomes stuck. Without the Modified CTS strategy, such directional shifts will result in excessive torques in the drive train when the engine speed is at high speeds.

Other aspects, objects and advantages of this invention can be obtained from a study of the drawings, disclosure and the appended claims.

We claim:

1. A control system for a vehicle having an engine connected to and adapted to drive an automatic transmission through a torque converter, the transmission including a plurality of transmission gear ratios and a means for automatically establishing a particular gear ratio in response to a transmission control signal, comprising:

a transmission controller adapted to sense at least one operating parameter and produce transmission control signals in response to the sensed parameter and in accordance with a predetermined shift map, the transmission controller further being adapted to produce a CTSSPEED signal during a change from an old gear ratio to a new gear ratio, the CTSSPEED signal corresponding to a speed which is a predetermined amount above a synchronization speed of the new gear for an upshift and a predetermined amount below the synchronization speed in the new gear for a downshift;

an engine speed sensor adapted to sense engine speed and produce an actual engine speed signal;

means for producing an operator desired engine speed signal; and an engine controller adapted to receive the operator desired engine speed, actual engine speed and the CTSSPEED signals, calculate an error signal in response to a difference between the actual and desired speed signals when the CTSSPEED signal is not received, calculate an error signal in response to a difference between the CTSSPEED signal and the actual engine speed signal when the CTSSPEED signal is received, and regulate actual engine speed so as to reduce the error signal to zero.

2. A control system as set forth in claim 1 wherein the engine controller produces a fuel injection signal in response to the error signal.

3. A control system as set forth in claim 1 wherein the transmission controller begins production of the CTSSPEED signal a first time period following initiation of the gear change operation and thereafter continues to produce the CTSSPEED signal for a second time period, the first time period corresponding to time required for the transmission to disengage the old gear ratio and the second time period corresponding to the time required for the transmission to engage the new gear ratio.

4. A control system as set forth in claim 1, wherein the engine and transmission controllers are embodied in separate microprocessors.

5. A control system as set forth in claim 1, wherein the operating parameter is responsive to vehicle speed.

6. A control system as set forth in claim 1, further including means for manual changing the transmission gear ratio, and wherein during preselected manual gear changes the transmission controller is adapted to set the CTSSPEED signal to a value which is lower than the CTSSPEED for an automatic gear change.

7. A control system as set forth in claim 6, wherein during the preselected manual gear changes the CTSSPEED signal is set to a value which corresponds to engine idle speed.

8. A control system as set forth in claim 6, wherein during the preselected manual gear changes the transmission controller is adapted to set the second time period to a value which is greater than the second time period for an automatic gear change.

9. A control system as set forth in claim 8, wherein the values of the CTSSPEED signal and second time duration are only modified if engine speed is above a preselected value at the initiation of the manual shift.

10. A control system as set forth in claim 9, wherein the values of the CTSSPEED signal and the second time duration are only modified during directional changes or shifts out of neutral.

11. A control system for a vehicle having an engine connected to and adapted to drive an automatic transmission through a torque converter, the transmission including a plurality of transmission gear ratios and a means for automatically establishing a particular gear ratio in response to a transmission control signal, comprising:

a first microprocessor-based controller adapted to sense at least one operating parameter and produce transmission control signals in response to the sensed parameter and in accordance with a predetermined shift map, the first microprocessor-based controller further being adapted to produce a CTSSPEED signal a first time period following initiation of a gear change operation and thereafter continue production of the CTSSPEED signal for a second time period, the CTSSPEED signal corresponding to a speed which is a predetermined amount above a synchronization speed of the new gear for an upshift and a predetermined amount below the synchronization speed in the new gear for a downshift, the first time period corresponding to time required for the transmission to disengage the old gear ratio and the second time period corresponding to the time required for the transmission to engage the new gear ratio;

an engine speed sensor adapted to sense engine speed and produce an actual engine speed signal;

means for producing an operator desired engine speed signal; and a second microprocessor-based controller adapted to receive the operator desired engine speed, actual engine speed, and the CTSSPEED signals, calculate an error signal in response to a difference between the actual and desired speed signals when the CTSSPEED signal is not received, calculate an error signal in response to a difference between the CTSSPEED signal and the actual engine speed signal when the CTSSPEED signal is received, and regulate engine speed into so as to reduce the error signal to zero.

12. A control system as set forth in claim 11 wherein the second microprocessor-based controller produces a fuel injection signal in response to the error signal.

13. A control system as set forth in claim 12, further including means for manually changing the transmission gear ratio and wherein during preselected manual gear changes the first microprocessor-based controller is adapted to set the CTSSPEED signal to a value which corresponds to engine idle and to set the second time period to a value which is greater than the second time period for an automatic gear change.

14. A method of effecting shifts in a vehicle having an engine connected to and adapted to drive an automatic transmission through a torque converter, the transmission including a plurality of transmission gear ratios and a transmission actuator for automatically establishing a particular gear ratio in response to a transmission control signal, comprising the steps of:

sensing when a gear change is required and determining a first time period, a second time period and a desired engine speed, the first time period corresponding to time required for the transmission to disengage the old gear ratio, the second time period corresponds to the time required for the transmission to engage the new gear ratio and the desired speed corresponding to a speed which is a predetermined amount above a synchronization speed of the new gear for an upshift and a predetermined amount below the synchronization speed in the new gear for a downshift;

initiating the gear change operation;

determining when a time equal to the first time period has elapsed since the shift was initiated and regulating engine speed into correspondence with the desired speed for a period of time equal to the second time period; and thereafter controlling engine speed in accordance with an operator desired engine speed until another shift is required.

15. A method as set forth in claim 14, wherein the operating parameter is responsive to vehicle speed.

16. A method as set forth in claim 14, wherein during preselected manual gear changes the desired speed is set to a value which is lower than the desired speed for an automatic gear change.

17. A method as set forth in claim 16, wherein during preselected manual gear changes the second time period is set to a value which is longer than the second time period for automatic gear change.

18. A method as set forth in claim 17, wherein during preselected manual gear changes the desired speed signal is set to a value which corresponds to engine idle speed.

19. A method as set forth in claim 18, wherein the values of the desired speed and second time duration are only modified if actual engine speed is above a preselected value at the initiation of the manual shift.

20. A method as set forth in claim 19, wherein the values of the desired speed signal and second time duration are only modified during directional changes or shifts out of neutral.

* * * * *